(12) United States Patent
Lee et al.

(10) Patent No.: US 11,221,146 B2
(45) Date of Patent: Jan. 11, 2022

(54) COOKING APPLIANCE

(71) Applicant: LG ELECTRONICS INC., Seoul (KR)

(72) Inventors: Kookhaeng Lee, Seoul (KR); Yangho Kim, Seoul (KR); Dongjae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 225 days.

(21) Appl. No.: 16/518,067

(22) Filed: Jul. 22, 2019

(65) Prior Publication Data

US 2020/0025391 A1   Jan. 23, 2020

(51) Int. Cl.
| | |
|---|---|
| F24C 15/00 | (2006.01) |
| F24C 15/20 | (2006.01) |
| F24C 15/32 | (2006.01) |
| A21B 1/26 | (2006.01) |

(52) U.S. Cl.
CPC .............. F24C 15/006 (2013.01); A21B 1/26 (2013.01); F24C 15/2007 (2013.01); F24C 15/322 (2013.01)

(58) Field of Classification Search
CPC ....... F24C 15/322; F24C 15/32; F04D 29/441
See application file for complete search history.

(56) References Cited

U.S. PATENT DOCUMENTS

| | | | | | |
|---|---|---|---|---|---|
| 3,499,431 | A | * | 3/1970 | McArthur, Jr. ....... | F24C 14/025 126/39 R |
| 4,108,139 | A | * | 8/1978 | Gilliom ................. | F24C 15/006 126/21 A |
| 4,373,504 | A | * | 2/1983 | Day ...................... | F24C 15/322 126/21 A |
| 4,375,213 | A | * | 3/1983 | Kemp ................... | F24C 15/006 126/21 A |
| 4,392,038 | A | * | 7/1983 | Day ...................... | H05B 6/6405 126/21 A |
| 4,430,541 | A | * | 2/1984 | Day, Jr. ................. | F24C 15/322 126/21 A |

(Continued)

FOREIGN PATENT DOCUMENTS

| | | |
|---|---|---|
| CA | 1 138 937 | 1/1983 |
| DE | 3535795 A1 * | 4/1987 |

(Continued)

OTHER PUBLICATIONS

Korean Notice of Allowance dated Oct. 24, 2019.
European Search Report dated Nov. 19, 2019.

*Primary Examiner* — Jorge A Pereiro
(74) *Attorney, Agent, or Firm* — Ked & Associates LLP

(57) ABSTRACT

A cooking appliance is provided. The cooking appliance may include a convection fan installed in a cooking chamber; a fan motor installed outside of the cooking chamber and configured to rotate the convection fan; a cooling fan installed outside of the cooking chamber and rotated by the fan motor to generate air currents to flow to the fan motor; a duct that forms a passage that connects an inside of the cooking chamber and the outside of the cooking chamber, wherein an opening in the duct is opened toward the cooling fan; and a blocking member installed outside of the cooking chamber and configured to block a path of air flow from the opening to the cooling fan.

13 Claims, 11 Drawing Sheets

(56) References Cited

U.S. PATENT DOCUMENTS

| | | | | |
|---|---|---|---|---|
| 4,598,691 A * | 7/1986 | Herrelko | ............. | F24C 15/2007 |
| | | | | 126/19 R |
| 4,627,409 A * | 12/1986 | Kagomoto | ............ | F24C 15/322 |
| | | | | 126/19 R |
| 4,865,010 A * | 9/1989 | Kett | ...................... | F24C 15/006 |
| | | | | 126/21 R |
| 5,288,203 A * | 2/1994 | Thomas | ................ | F04D 29/582 |
| | | | | 165/124 |
| 6,069,344 A * | 5/2000 | Krasznai | ............... | F24C 15/322 |
| | | | | 219/400 |
| 7,063,504 B2 * | 6/2006 | Huang | ................ | F04D 25/0613 |
| | | | | 415/165 |
| 9,039,361 B2 * | 5/2015 | Fukuda | ............... | F04D 25/0613 |
| | | | | 415/206 |

FOREIGN PATENT DOCUMENTS

| | | | |
|---|---|---|---|
| DE | 279044 A * | 5/1990 | |
| ES | 2 331 392 | 12/2009 | |
| JP | 59-81430 | 5/1984 | |
| JP | 60-20026 | 2/1985 | |
| JP | 63-142613 | 9/1988 | |
| JP | 07-00063 | 1/1995 | |
| JP | 2015-204662 | 11/2015 | |
| KR | 20030059905 A * | 7/2003 | |
| KR | 10-1789824 | 10/2017 | |

\* cited by examiner

COOKING APPLIANCE

CROSS-REFERENCE TO RELATED APPLICATION(S)

This application claims priority to and the benefit of Korean Patent Application No. 10-2018-0085399, filed in Korea on Jul. 23, 2018, the disclosure of which is incorporated herein by reference in its entirety.

BACKGROUND

1. Field

A cooking appliance, and more specifically, a cooking appliance used to cook food items is disclosed herein.

2. Background

A cooking appliance is an appliance that is placed in the kitchen and that cooks food items according to a users intention. Cooking appliances may be classified into various sorts of appliances on the basis of the sort of heat sources, types and fuels.

When it comes to the way of cooking food, cooking appliances may be classified into opened type cooking appliances and closed type cooking appliances depending on whether a space in which food items are placed is opened or closed. The closed type cooking appliances include ovens, microwave ovens and the like, and the opened type cooking appliances include cooktops, hobs, griddles and the like.

The closed type cooking appliances shield a space in which foods are placed and heat the shielded space to cook foods. The closed type cooking appliances are provided with a cooking chamber that is a space in which foods are placed and which is shielded when foods are cooked. The cooking chamber is substantially a space for cooking foods.

Additionally, the closed type cooking appliances are provided with a swivel-mounted door that optionally opens and closes the cooking chamber. The door is swivel-mounted in a main body that has the cooking chamber therein by a door hinge provided between the main body and the door, and swivels around a portion in which the door and the main body are coupled through the door hinge to optionally open and close the cooking chamber.

The inner space of the cooking chamber, which is opened and closed by the door, is provided with a heat source to heat the cooking chamber. The heat source may include a gas burner, an electric heater and the like.

Closed type cooking appliances that use a gas burner as a heat source may be provided with a plurality of burners to heat food inside the cooking chamber. For example, a broil burner is installed in the upper portion of the cooking chamber, and a bake burner is installed in the lower portion or at the rear of the cooking chamber.

Additionally, a convection device may be further provided at the rear of the cooking chamber. The convection device circulates air inside the cooking chamber to evenly deliver heat to the cooking chamber as a whole.

The convection device may include a burner that is placed at the rear surface of the cooking chamber, a convection fan that circulates heat supplied by the burner into the cooking chamber, a fan motor that provides rotation forces to the convection fan, and a cooling fan that cools the fan motor. The convection fan and the cooling fan are connected to the same axis and rotated together by driving forces supplied by the fan motor.

In the convection device, the burner and the convection fan are installed inside the cooking chamber, the fan motor and the cooling fan are installed in a separate rear space partitioned off from the cooking chamber at the rear of the cooking chamber. In addition to the fan motor and the cooling fan, various pipes and valves, and other electronic parts and the like in relation to the supply of gas to the burner of the convection device and the broil burner may be installed in the rear space.

Additionally, a passage (hereinafter referred to as "intake passage") for supplying air required for combusting fuels of the broil burner to the broil burner may be provided in the rear space. When fuels of the broil burner are combusted, mixes gases in which air and gases are mixed are provided to the broil burner from the rear space partitioned off from the cooking chamber through the intake passage.

When the convection device operates, the burner inside the cooking chamber generates heat, and the convection fan rotated by the fan moor circulates the generated heat into the cooking chamber. Additionally, when the convection fan rotates, the cooling fan connected with the fan motor rotates together with the convection fan and generates air currents for cooling the fan motor. Accordingly, even when the convection device operates for a long period of time, the fan motor may be continuously cooled to prevent overheating of the fan motor.

However, when the temperature of the cooking chamber remains high for a long time as in the self-cleaning mode, high-temperature air inside the cooking chamber may flow reversely to the rear space in which the cooling fan is installed through the intake passage.

The reversed flow occurs in the way that hot air inside the cooking chamber is introduced into the broil burner through flame holes of the broil burner, and then reversely flows to the rear space through the intake passage that connects the broil burner and the rear space.

The operation of cooling the fan motor performed by the cooling fan during the operation of the convection device is the cause of the reversed flow. That is, the cooling fan generates air currents that allow the surrounding air to flow to the fan motor, to cool the fan motor. The air currents allow hot air in the cooking chamber to be discharged through the intake passage. Accordingly, the hot air in the cooking chamber reversely flows to the rear space.

When the reversed flow occurs, hot air may be introduced into the fan motor, may raise the temperature of the fan motor, may raise the temperature of the rear space, and adversely affects various pipes and valves, other electronic parts and the like in the rear space. Additionally, as the temperature of the rear space goes up, the temperature of the outer wall of the cooking appliance also goes up, thereby adversely affecting the safety of a user.

When the intake passage is placed closer to the cooling fan, the countercurrent of hot air into the rear space is highly likely to occur. Accordingly, when the intake passage is placed farther from the cooling fan, the countercurrent of hot air into the rear space may be suppressed.

However, considering the size and radius of rotation of the convection fan, it is difficult to displace the fan motor and the cooling fan from where they are placed, i.e., near a central portion of a cooking appliance in the left-right direction. Additionally, considering the position of the broil burner, it is difficult to displace the intake passage. Thus, there is a need to find ways to suppress the countercurrent of hot air into the rear space without displacing the cooling fan and the intake passage.

BRIEF DESCRIPTION OF THE DRAWINGS

Embodiments will be described in detail with reference to the following drawings in which like reference numerals refer to like elements, and wherein.

DETAILED DESCRIPTION

Figure 1:
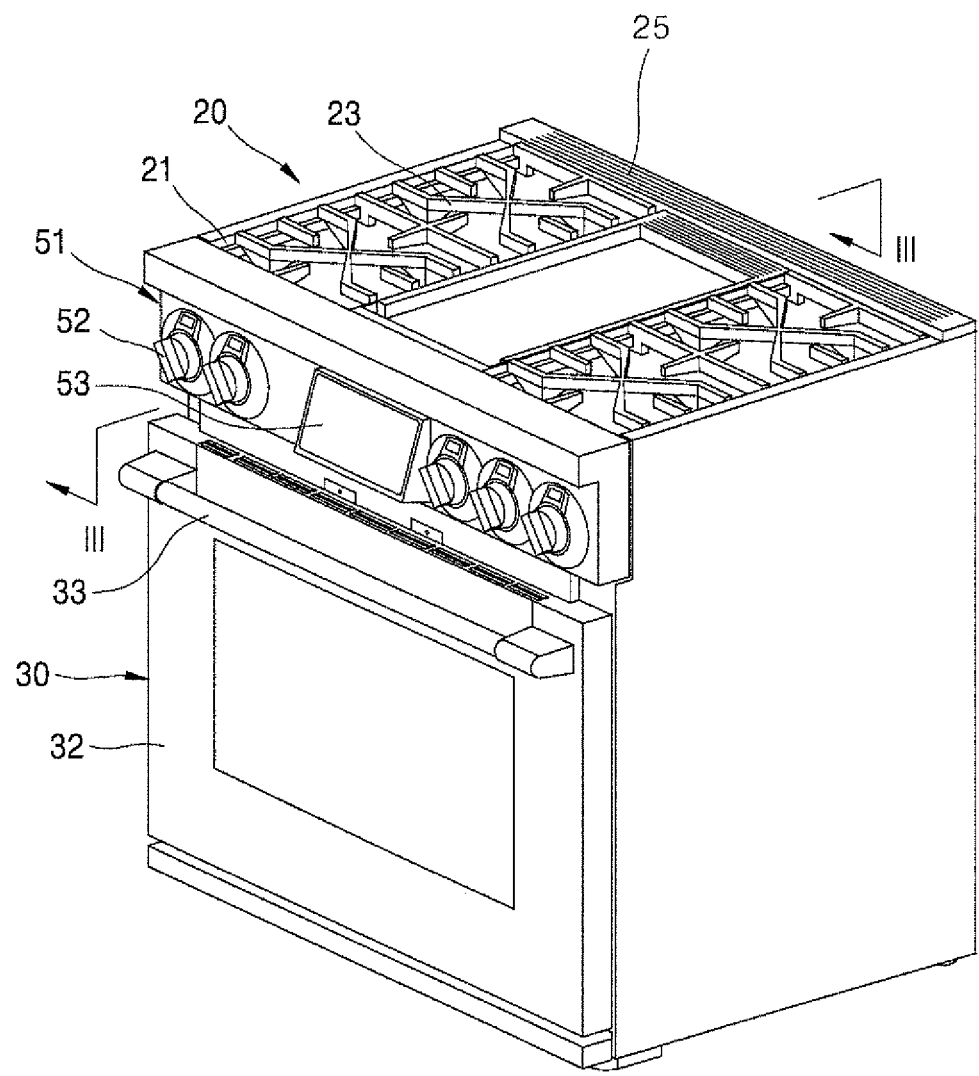
FIG. 1 is a perspective view illustrating a cooking appliance according to an embodiment.

Below, embodiments of the cooking appliance according to the present disclosure are described with reference to the attached drawings. During description of the embodiments, the thickness of lines or the size of the elements illustrated in the drawings may be exaggerated for the sake of convenience and clarity in description. Further, the terms that are described hereunder are those defined considering the functions described in the present invention and may differ depending on the intention or the practice of the user or operator. Therefore, such terms should be defined on the basis of what is described throughout the specification.

[Entire Structure of Cooking Appliance]

Figure 2:
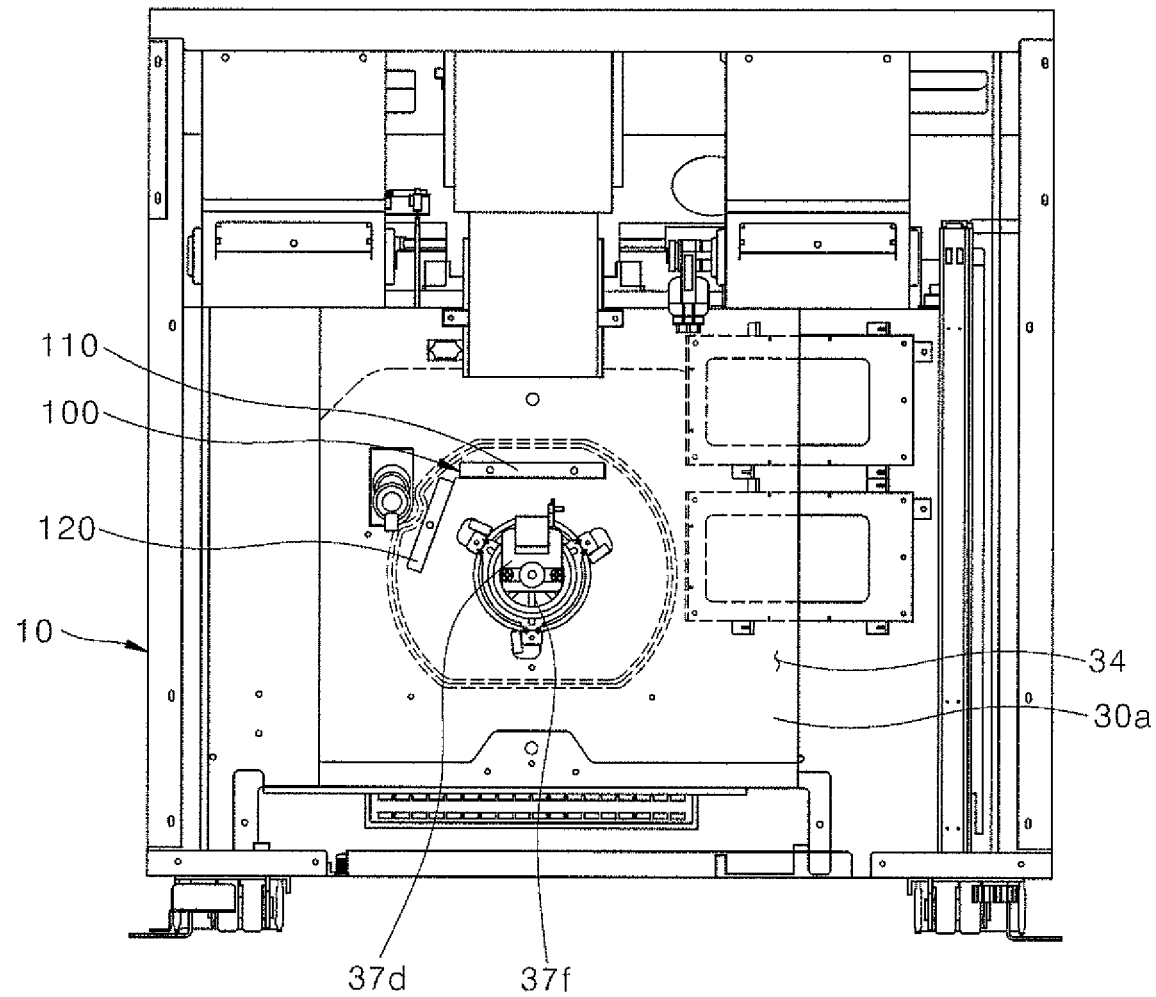
FIG. 2 is a rear view illustrating a rear surface of the cooking appliance in FIG. 1.
Figure 3:
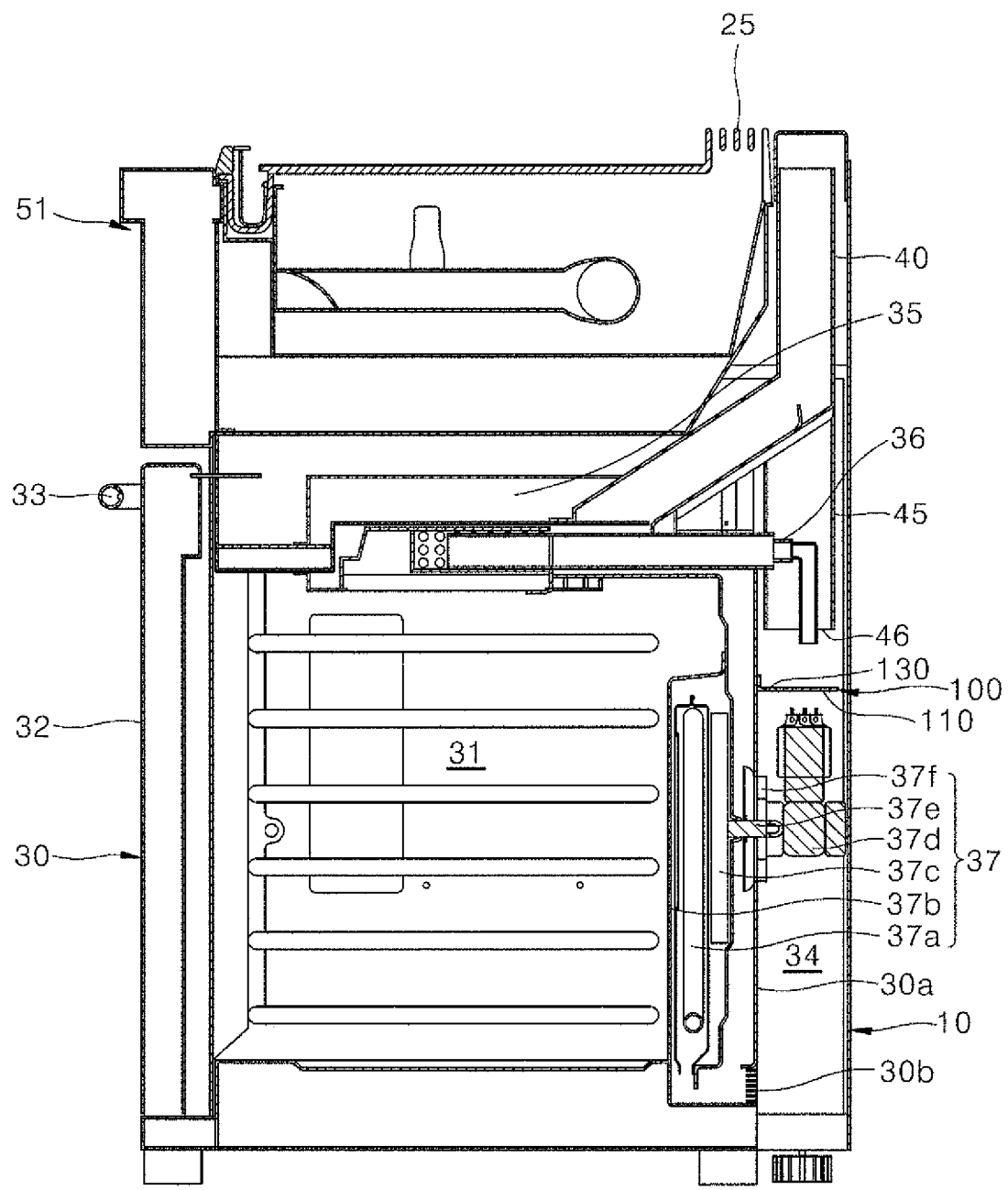
FIG. 3 is a sectional view along the line "III-III" in FIG. 1.

FIG. 1 is a perspective view illustrating a cooking appliance according to an embodiment, FIG. 2 is a rear view illustrating a rear surface of the cooking appliance in FIG. 1, and FIG. 3 is a sectional view along the line "III-III" in FIG. 1.

Referring to FIGS. 1 and 2, the appearance of a cooking appliance according to an embodiment is formed by a cabinet 10. The cabinet 10 may have a shape including an approximate cuboid and may include a material having a predetermined strength to protect a plurality of parts therein.

The cabinet 10 is provided with an open space. Here, a cooktop unit 20 that cooks food by heating a food item or a container containing the food item, may be placed on the upper side of the cabinet, in the upper end portion thereof.

At least one or more of cooktop heating units 23 are placed in the cooktop unit 20 to heat food items subject to cooking or a container that contains food items.

Additionally, an oven unit 30 is installed on the lower side of the cooktop unit 20. A cooking chamber 31 (see FIG. 4) that provides a space for cooking food items is placed inside the oven unit 30.

The cooking chamber 31 has the shape of a cuboid the front surface of which is opened, and food items are cooked by heating the inner space of the cooking chamber 31 with the cooking chamber 31 being shielded. That is, in the oven unit 30, the inner space of the cooking chamber 31 is a space in which food items are substantially cooked.

A broil burner 35 that heats the inner space of the cooking chamber 31 from above may be placed on the upper side of the cooking chamber 31, and a burner in the form of a baker burner that heats the inner space of the cooking chamber 31 from below may be further placed on the lower side of the cooking chamber 31.

Additionally, a convection unit 37 that heats the inner space of the cooking chamber 31 through convection of hot air may be further provided on the rear side of the cooking chamber 31.

The convection unit 37 forces air inside the cooking chamber 31 to flow, That is, the convection unit 37 suctions and heats air inside the cooking chamber 31, and then allows the air to flow while discharging the air into the inner space of the cooking chamber 31, and heats the inner space of the cooking chamber 31, thereby evenly heating food items inside the cooking chamber 31.

A door 32 that optionally opens and closes the cooking chamber 31 is swivel-mounted to the oven unit 30. The door 32 may open and close the cooking chamber 31 in the pull-down manner in which the upper end of the door swivels vertically with respect to the lower end of the door.

The door 32 has the shape of a cuboid having a predetermined thickness as a whole, and a handle 33 is installed at the front surface of the door such that a user may grip the handle when the user wants to swivel the door 32. The user may readily swivel the door 32 using the handle 33.

A control panel 51 may be placed on the front surface of the cooktop unit 20, i.e., the upper side of the door 32. The control panel 51 may have the shape of a cuboid with a predetermined inner space. An input unit 52 to which operating signals for operating the cooktop unit 20 and the oven unit 30 are input by a user is placed on the front surface of the control panel 51.

A plurality of operating switches are provided to the input unit 52. Accordingly, the user may directly input operating signals. In this case, the operating switches may be provided in the form of a knob that may be operated by a rotation or may be provided in the form of a button or a panel that may be operated by a press or by a touch.

Additionally, a display part 53 that provides information on operation of the cooking appliance or information on cooking food items and the like may be further provided to the control panel 51. The user may check various sorts of information on the cooking appliance through the display unit 53.

A rear space 34 is provided at the rear of the cooking chamber 31. The rear space 34 is placed at the rear of the cabinet 10 and is a space that is partitioned off from the cooking chamber 31 by a partition surface 30a that separates between the cooking chamber 31 and the rear space 34 in the front-rear direction. The front boundary surface of the rear space 34 may be defined by the partition surface 30a, and the rear boundary surface of the rear space 34 may be defined by a rear wall that is installed at the rear of the cabinet 10.

[Structure of Cooking Chamber for Heating and Discharging of Combustion Gas]

In the embodiment, the cooking appliance, as illustrated in FIG. 3, is provided with a broil burner 35 and a convection unit 37 inside the cooking chamber 31, as an example.

The broil burner 35 is placed inside the cooking chamber 31 and provided to heat the inside of the coking chamber 31 from the upper portion of the cooking chamber 31. One side of the broil burner 35 may be coupled to the upper surface of the cooking chamber 31, and the other side of the broil burner 35 may be coupled to the rear surface of the cooking chamber 31.

The broil burner 35 may have the shape of a straight pipe that has a length extending in the front-rear direction of the cabinet 10 (hereinafter referred to as "front-rear-direction") or the shape of a "U" pipe the ends of which both face the front of the cabinet 10.

A flow path to which mixed gases are provided may be formed to extend in the front-rear direction inside the broil burner 35. Additionally, flame holes may be formed to penetrate in a lateral portion of the broil burner 35.

The flame hole forms a passage that discharges gases in the broil burner 35 out of the broil burner 35. The flame holes may be spaced a predetermined distance apart from each other in the lengthwise direction of the broil burner 35. By doing so, a plurality of passages for discharging gases may be provided in the broil burner 35 in the lengthwise direction thereof.

The broil burner 35 is provided with gases that are mixed with air, i.e., mixed gases, through a mixing tube 36. The mixed gases, supplied to the flow path in the broil burner 35 through the mixing tube 36 as described above, are discharged out of the broil burner 35 through the flame holes, are burned and generate flames outside the broil burner 35.

The mixing tube 36 may have the shape of a straight pipe, one side of which is connected to the broil burner 35. A flow path in which gases are mixed with air is formed by the mixing tube 36. The mixing tube 36 connects the broil burner 35 in the cooking chamber 31, and a below-described duct 45 in the rear space 34.

The convection unit 37 may be placed in the rear space 34, i.e. at the rear of the cooking chamber 31, and may include a burner 37a, a fan cover 37b, a convection fan 37c, and a fan motor 37d.

The burner 37a may be installed at the rear surface of the cooking chamber 31, and may have the shape of a hollow pipe that extends to form a "U"-shaped curve. A plurality of flame holes may be formed in a lateral portion of the burner 37a. Mixed gases, provided into the burner 37a, are burned while being discharged out of the burner 37a through the flame holes and generate flames outside the burner 37a.

The fan cover 37b forms a separated accommodation space in the cooking chamber 31. The fan cover 37b is provided with an intake opening and an exhaust opening. Air inside the cooking chamber may be introduced into the fan cover 37b through the intake opening at the center of the fan cover 37b, and the air heated in the fan cover 37b may be discharged to the cooking chamber 31 through the exhaust opening in both lateral portions of the fan cover 37b.

The convection fan 37c may be placed in the accommodation space inside the fan cover 37b and may be rotate by the drive of the fan motor 37d that is connected to the convection fan 37c. Through the operation of the convection fan 37c, air circulation during which air inside the cooking chamber is introduced into the fan cover 37b through the intake opening and the air heated in the fan cover 37b is discharged to the cooking chamber 31 through the exhaust opening may occur.

The fan motor 37d supplies a driving force that rotates the convection fan 37c. The fan motor 37d is placed in the rear space 34 at the rear of the cooking chamber 31. A shaft 37e of the fan motor 37d passes through the partition surface 30a, connects with the convection fan 37c in the cooking chamber 31, and delivers the driving forces of the fan motor 37d to the convection fan 37c. The fan motor 37d is placed in the rear space 34 that is partitioned off from the cooking chamber 31 not in the cooking chamber 31 to protect the fan motor 37d from the heat in the high-temperature cooking chamber 31.

An inlet 30b for supplying air outside the cooking chamber 31 toward the convection fan 37c is formed in the partition surface 30a. The inlet 30b is formed to penetrate in the lower portion of the partition surface 30a. The inlet 30b forms a flow path for introducing air outside the cooking chamber 31 into the cooking chamber 31, specifically, into the accommodation space between the fan cover 37b and the partition surface 30a. The inlet 30b may be provided as a flow path for supplying secondary air required for combusting fuels of the burner 37a.

Additionally, an exhaust duct 40 may be placed in the upper portion of the cooking chamber 31, and an exhaust vent 25 may be placed at the rear of the upper portion of the cooking appliance.

The exhaust duct 40 connects the inside of the cooking chamber 31 and the exhaust vent 25 in the upper portion of the cooking chamber 31. A flow path that guides high-temperature combustion gases generated in the cooking chamber 31 to the exhaust vent 25 is formed by the exhaust duct 40.

The exhaust vent 25 is placed at the rear of the cooktop unit 20 provided in the upper portion of the cooking appliance. The high-temperature combustion gases that are moved toward the exhaust vent 25 through the exhaust duct 40 may be discharged out of the cooking appliance through the exhaust vent 25.

Further, in the rear space 34, a duct 45 that connects the cooking chamber 31 and the exhaust duct 40 may be provided in the rear space 34. The duct 45 is placed at the rear of the cooking chamber 31 and in the lower portion of the exhaust duct 40. The duct 45 is connected with the broil burner 35 that passes from the cooking chamber 31 through the partition surface 30a and that protrudes to the rear space 34, or with the mixing tube 36 connected with the broil burner 35. The upper portion of the duct 45 is connected with the exhaust duct 40. Additionally, an opening 46 is formed in the lower portion of the duct 45, and through the opening 46, the lower portion of the duct 45 is opened toward the rear space 34.

The duct 45 is provided in the way that encircles the broil burner 35 protruding from the rear space 34, or the mixing tube 36 connected with the broil burner 35, from the outside. The duct 45 protects the broil burner 35 or the mixing tube 36 from the outside, and provides a passage for introducing the air introduced into the mixing tube 36 and a passage that allows a nozzle, supplying gases to the mixing tube 36, to connect with the mixing tube 36. Additionally, when combustion gases generated in the cooking chamber 31 are introduced toward the rear space 34 through the broil burner 35 and the mixing tube 36, the duct 45 may guide the combustion gases to the exhaust duct 40.

[Cooling Structure of Fan Motor]

Referring to FIGS. 1 to 3, a cooling fan 37f is placed in the rear space 34. The cooling fan 37f is rotated by the fan motor 37d and generates air currents that allow air around the fan motor 37d to flow to the fan motor 37d.

According to the embodiment, the convection fan 37c, the cooling fan 37f, and the fan motor 37d are connected to the same axis and placed in the front-rear direction. The convection fan 37c is placed at the forefront of them, the fan motor 37d is place at the rearmost position of them, and the cooling fan 37f is placed between the convection fan 37c and the fan motor 37d. That is, the convection fan 37c is placed inside the cooking chamber 31, the fan motor 37d is placed in the rear space 34, and the cooling fan 37f is placed in the rear space 34 while installed on the partition surface 30a.

Additionally, the convection fan 37c, and the cooling fan 37f are installed together on a single shaft 37e that extends forward from the fan motor 37d, and rotated together when the fan motor 37d is driven. That is, when the fan motor 37d is driven to rotate the convection fan 37c, the cooling fan 37f generates air currents for cooling the fan motor 37d while rotating together with the convection fan 37c.

The air currents generated by the cooling fan 37f are formed in the way that air around the cooling fan 37f and the fan motor 37d flows toward the fan motor 37d at the rear of the cooling fan 37f by the rotation of the cooling fan 37f. That is, air currents, in which with respect to the cooling fan 37f, air outside the cooling fan 37f passes from the rear of the cooling fan 37f through the fan motor 37d, is suctioned into the cooling fan 37f and then discharged to the front of the cooling fan 371, are formed.

The air currents that are generated as described above cools the fan motor 37d to prevent the overheating and lowered performance of the fan motor 37d, caused due to an increase in the temperature of the fan motor 37d.

According to the embodiment, the opening 46 of the duct 45 is placed in the upper portion of the cooling fan 371. The cooling fan 37f, and the opening 46 of the duct 45 are placed approximately at the center in the left-right direction, and the cooling fan 37f and the opening 46 of the duct 45 are placed to be adjacent to each other in the up-down direction.

Considering the size and the radius of rotation of the convection fan 37c, the fan motor 37d has to be placed approximately at the center in the left-right direction. Accordingly, the cooling fan 37f also has to be placed approximately at the center in the left-right direction. Additionally, the broil burner 35 has to be placed approximately at the center in the left-right direction to evenly heat the upper portion of the cooking chamber 31. Accordingly, the mixing tube 36, and the duct 45 that encircles the mixing tube 36 also have to be placed approximately at the center in the left-right direction.

As a result, the cooling fan 37f is placed approximately at the center in the left-right direction, and the opening 46 of the duct 45 is placed in an upper portion adjacent to the cooling fan 37f.

[Configuration of Blocking Member]

Figure 4:
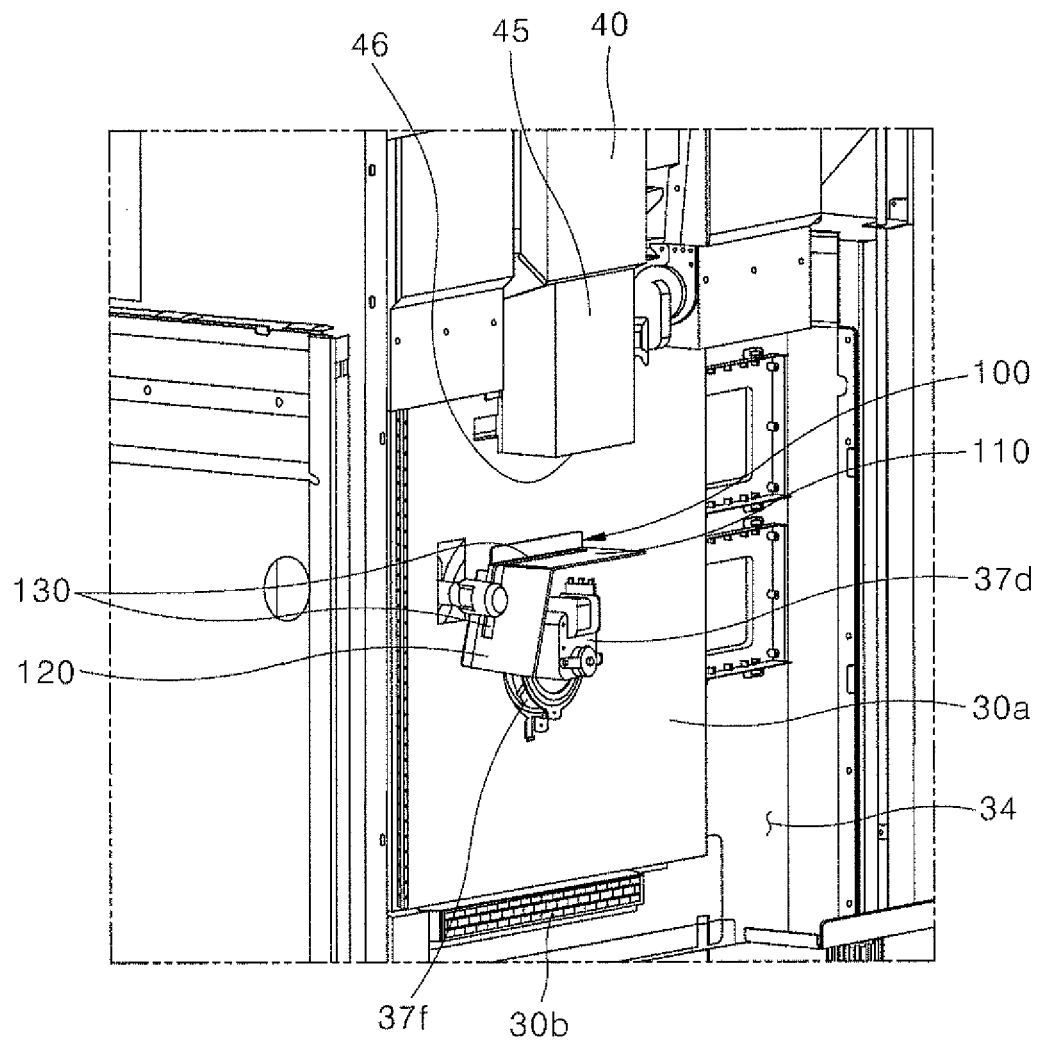
FIG. 4 is an exploded perspective view illustrating a portion of the rear surface of the cooking appliance in FIG. 2.
Figure 5:
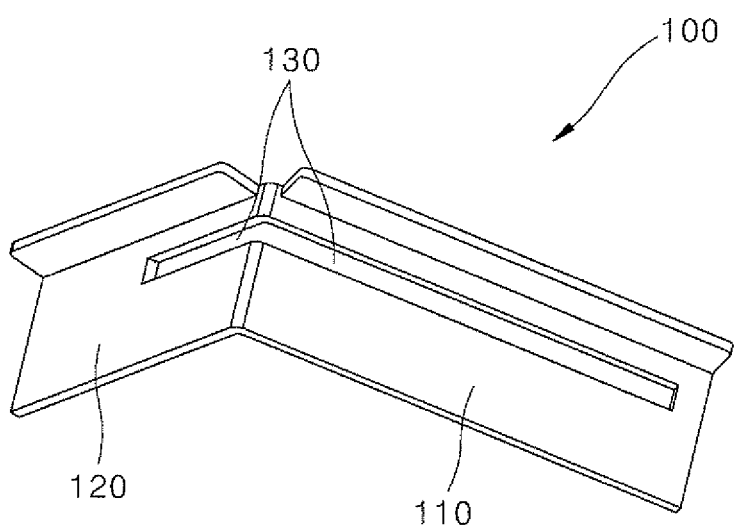
FIG. 5 is a perspective view separately illustrating the blocking member in FIG. 4.
Figure 6:
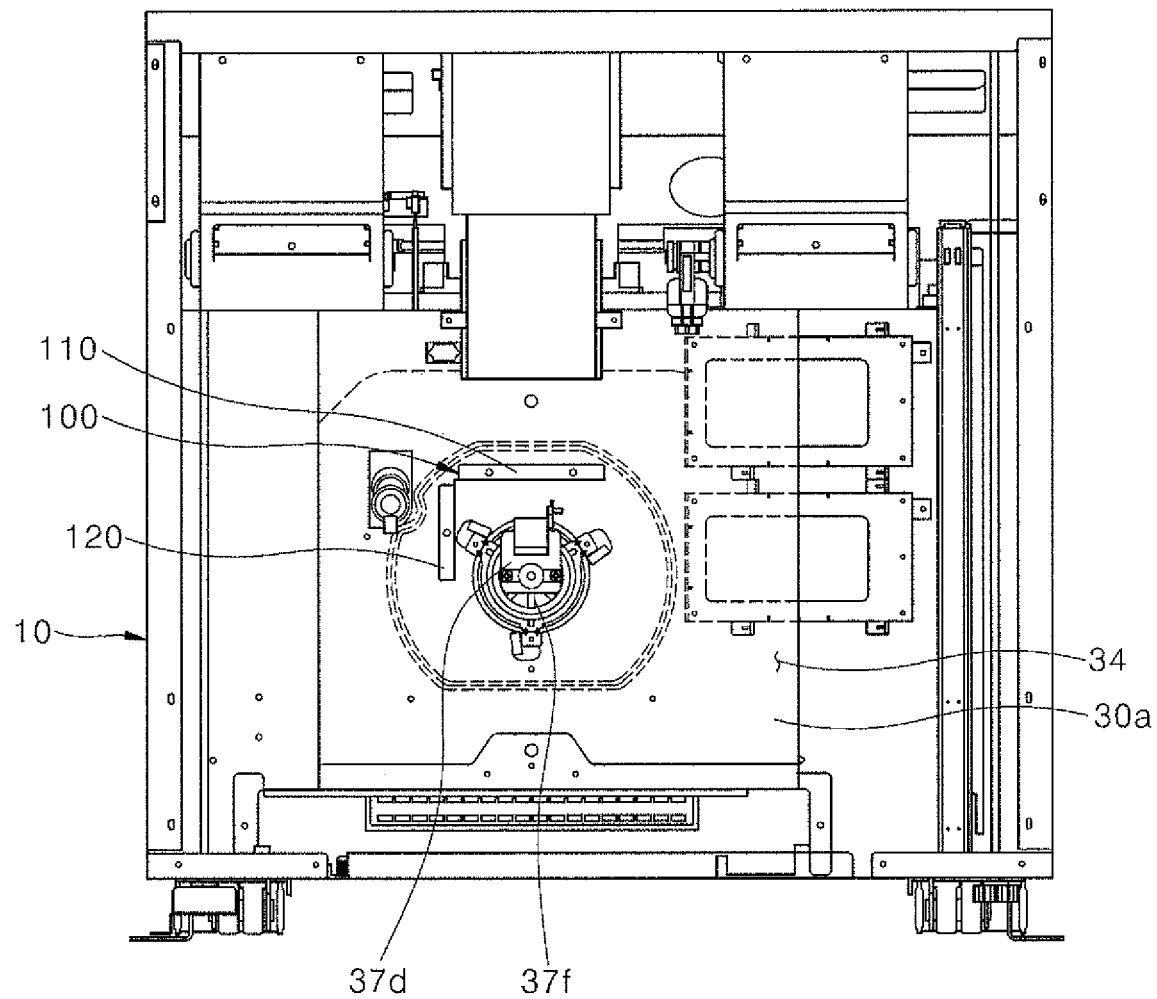
FIG. 6 is a view illustrating another example of the blocking member in FIG. 2.

FIG. 4 is an exploded perspective view illustrating a portion of the rear surface of the cooking appliance in FIG. 2, FIG. 5 is a perspective view separately illustrating the blocking member in FIG. 4, and FIG. 6 is a view illustrating another example of the blocking member in FIG. 2.

Referring to FIGS. 3 to 5, a blocking member 100 is provided between the cooling fan 37f and the duct 45 that are disposed as described above. The blocking member 100 is installed in the rear space 34, is disposed between the cooling fan 37f and the opening 46 and plays a role in blocking the path of airflow from the opening 46 to the cooling fan 37f. Preferably, the blocking member 100 may consist of a material through which air hardly passes, and a material that has a predetermined strength such that the shape of the blocking member 100 is not changed by air currents formed by the cooling fan 37f.

According to the embodiment, the blocking member 100 may include a first blocking unit 110 and a second blocking unit 120.

The first blocking unit 110 is placed between the opening 46 of the duct 45, and the cooling fan 37f, and forms a blocking wall that separates the opening 46 from the cooling fan 37f. The first blocking unit 110 may have the shape of a transversely flat surface that The first blocking unit 110 is formed to have a width that extends in the direction of a tangent line of a circle formed by the cooling fan 37f rotating and a length that extends backward from the partition surface 30a. In this case, the first blocking unit 110 may have a width approximately corresponding to, or greater than a width of the opening 46 or a width of the cooling fan 371. Additionally, the first blocking unit 110 may have a length corresponding to or greater than a distance from the partition surface 30a on which the cooling fan 37f is installed to the rearmost point of the fan motor 37d.

When a width of the first blocking unit 110 is set as described above, the opening 46 and the cooling fan 37f that face each other in the up-down direction may be sufficiently separated by the first blocking unit 110.

An up-down passage between the opening 46 and the cooling fan 37f is blocked by the first blocking unit 110 with the above-described width. By doing so, the effect of airflow moving downward from the upper portion of the cooling fan 37f to the cooling fan 37f on the opening 46 of the duct 45 may be blocked.

Preferably, a width of the first blocking unit 110 is set to the extent that the width is not unnecessarily wide considering the size of a space taken up by the blocking member 100 in the rear space 34, and a position in which the second blocking unit 120 extended from the first blocking unit 110 is disposed, such that the opening 46 and the cooling fan 371 is sufficiently separated by the first blocking unit 110.

Additionally, a length of the first blocking unit 110 is set as described above considering that air currents formed by the operation of the cooling fan 37f are formed in the way that air outside the cooling fan 37f passes from the rear of the cooling fan 37f through the fan motor 37d, is suctioned into the cooling fan 37f and then discharged out of the front of the cooling fan 37f.

That is, when a length of the first blocking unit 110 has to be at least greater than or equal to a length corresponding to a distance from the partition surface 30a to the rearmost point of the fan motor 37d, hot air inside the duct 45 may be sufficiently blocked from passing the first blocking unit 110 and being suctioned into the rear of the cooling fan 37f.

The second blocking unit 120 is extended from the first blocking unit 110 while forming a blocking wall that is extended in the direction of a tangent line of a circle formed by the cooling fan 37f rotating. The second blocking unit 120 blocks a path of airflow between the opening 46 of the duct 45 and the cooling fan 37f among paths of airflow of air currents formed by the cooling fan 37f rotating while forming a blocking wall that blocks the path of airflow between the opening 46 of the duct 45 and the cooling fan 37f in the rest area except the area blocked by the first blocking unit 110.

The second blocking unit 120 is extended downward from one end of the first blocking unit 110 extended in the left-right direction. Preferably, an extended length of the second blocking unit 120 is set to a length long enough to block the flow of air that moves toward the cooling fan 37f while rotating laterally from the upper portion of the cooling fan 37f in the direction of rotation of the cooling fan 37f.

Additionally, like the first blocking unit 110, a length of the second blocking unit 120 in the front-rear direction is preferably set to a length corresponding to or greater than a distance from the partition surface 30a on which the cooling fan 37f is installed to the rearmost point of the fan motor 37d cooling fan 37f rotating In the embodiment, as an example, the second blocking unit 120 is extended in the direction of a tangent line of a circle formed by the cooling fan 37f rotating while inclinedly extended from the first blocking unit 110.

As another example, as illustrated in FIG. 6, the second blocking unit 120 may be extended downward from the first blocking unit 110 such that the first blocking unit 110 and second blocking unit 120 are connected in the shape of "T". In addition, an angle at which the first blocking unit 110 and second blocking unit 120 are connected may be properly set according to the sizes, shapes and the like of the fan motor 37d and cooling fan 37f.

Referring to FIGS. 3 to 5, the blocking member 100 may be provided in the shape of a bent plate consisting of metallic materials. For example, when a metallic plate prepared to manufacture a blocking member 100 is bent in the central portion thereof in the left-right direction, and one side of the metallic plate in the left-right direction may be formed as a first blocking unit 110, and the other side may be formed as a second blocking unit 120.

When a portion of the boundary between the first blocking unit 110 and the second blocking unit 120 is cut from the front in the front-rear direction, and then each of the cut portions is bent upward or downward, the bent portion may be provided as a coupling surface for coupling the blocking member 100 and the partition surface 30a.

An air discharging unit 130 is formed in at least any one of the first blocking unit 110 and the second blocking unit 120 of the blocking member 100. In the embodiment, as an example, the first blocking unit 110 and the second blocking unit 120 all include the air discharging unit 130.

The air discharging unit 130 forms a passage on the first blocking unit 110 or the second blocking unit 120. The passage allows air discharged from the cooling fan 37f to pass through the blocking member 100. The air discharging unit 130 is formed to penetrate on the first blocking unit 110 or the second blocking unit 120.

The air discharging unit 130 prepared as described above is formed in the shape of a slit that extends in the direction of a tangent line of a circle formed by the cooling fan 37f rotating. For example, the air discharging unit 130 in the first blocking unit 110 is formed in the shape of a slit that extends in the widthwise direction of the first blocking unit 110, and the air discharging unit 130 in the second blocking unit 120 is formed in the shape of a slit that extends in the widthwise direction of the second blocking unit 120. That is, the air discharging unit 130 forms a slit-shaped passage on the blocking wall formed by the first blocking unit 110 and the second blocking unit 120.

Among the air discharging units 130, the air discharging unit 130 formed in the first blocking unit 110 is formed to penetrate in a direction that faces the opening 46. The air discharging unit 130 formed as described above may allow air discharged from the cooling fan 37f to pass in the direction that faces the opening 46.

When seen from above, the air discharging unit 130 is disproportionately placed toward the front adjacent to the cooling fan 37f on the first blocking unit 110 or the second blocking unit 120, i.e., toward the front of the first blocking unit 110 or the second blocking unit 120, which is adjacent to the partition surface 30a.

The air discharging unit 130 is disposed considering the form of air currents generated by the cooling fan 37f. That is, considering the airflow in which air around the cooling fan 37f is suctioned into the cooling fan 37f through the rear of the cooling fan 37f, and the air suctioned into the cooling fan 37f is discharged from the cooling fan 37f through the front of the cooling fan 37f when the cooling fan 37f operates, the position of the air discharging unit 130 is determined.

Accordingly, when the cooling fan 37f operates, the suction of air through the rear of the cooling fan 37f may be blocked in the area in which the blocking member 100 is installed, and the discharge of air through the front of the cooling fan 37f may be performed through the air discharging unit 130.

If the suction and discharge of air by the cooling fan 37f are all blocked in the area in which the blocking member 100 is installed, the discharge of air that has been introduced through another area in which the blocking member 100 is not installed and that has cooled the fan motor 37d may be disturbed because a width of the passage through which air is discharged becomes narrow by the area in which the blocking member 100 is installed.

When the air having cooled the fan motor 37d is not smoothly discharged, air around the fan motor 37d does not circulate smoothly. Accordingly, the fan motor 37d may not be rightly cooled compared to the performance of the fan motor 37d.

Considering what is described above, in the embodiment, the air discharging unit 130 is formed in the blocking member 100 to allow the air having used to cool the fan motor 37d to be smoothly discharged.

Additionally, the air discharging unit 130 is disproportionately disposed toward the front of the cooling fan 37f, which usually discharges air suctioned into the cooling fan 37f rather than the rear of the cooling fan 37f, into which air is usually suctioned into the cooling fan 37f.

Accordingly, the suction of air into the cooling fan 37f may be blocked in the area in which the blocking member 100 is formed, and the discharge of air from the cooling fan 37f may be smoothly performed.

[Operation and Effect of Blocking Member]

Figure 7:
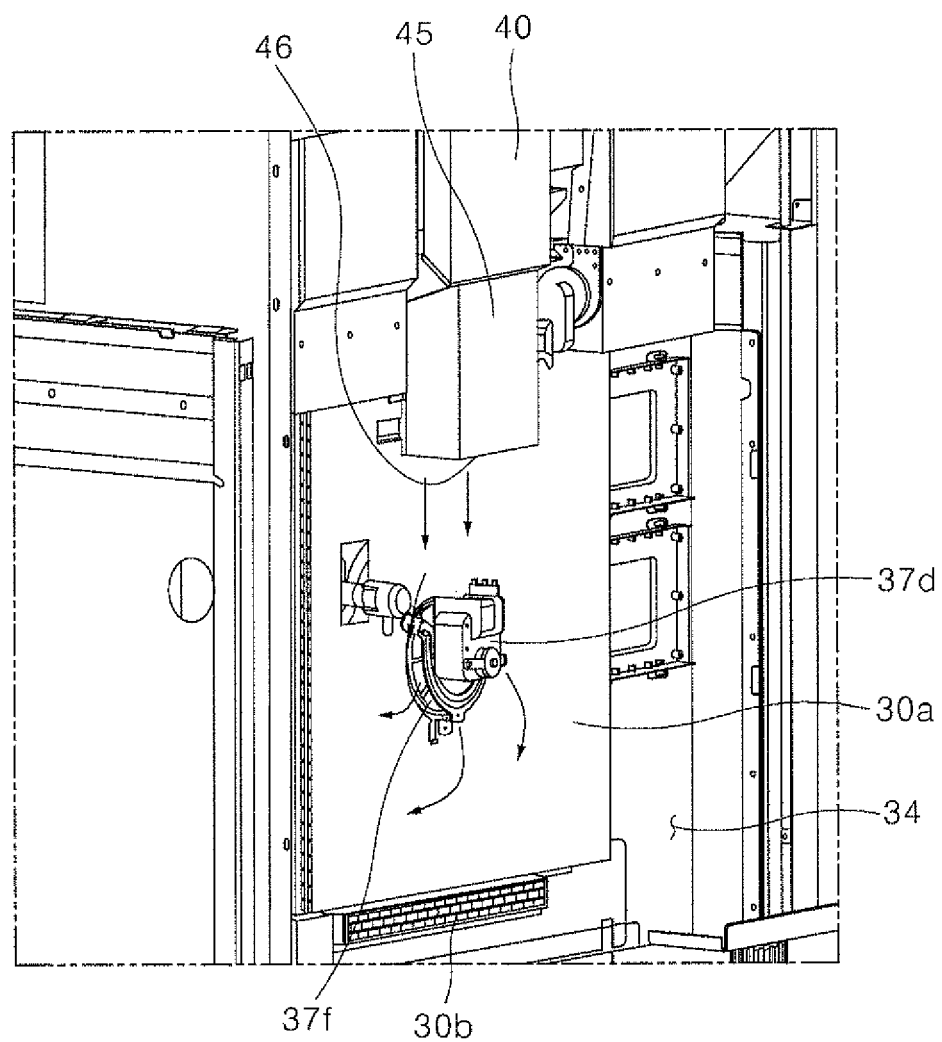
FIGS. 7 and 8 are views illustrating the countercurrent of heat that is generated in a cooking appliance without a blocking member.
Figure 8:
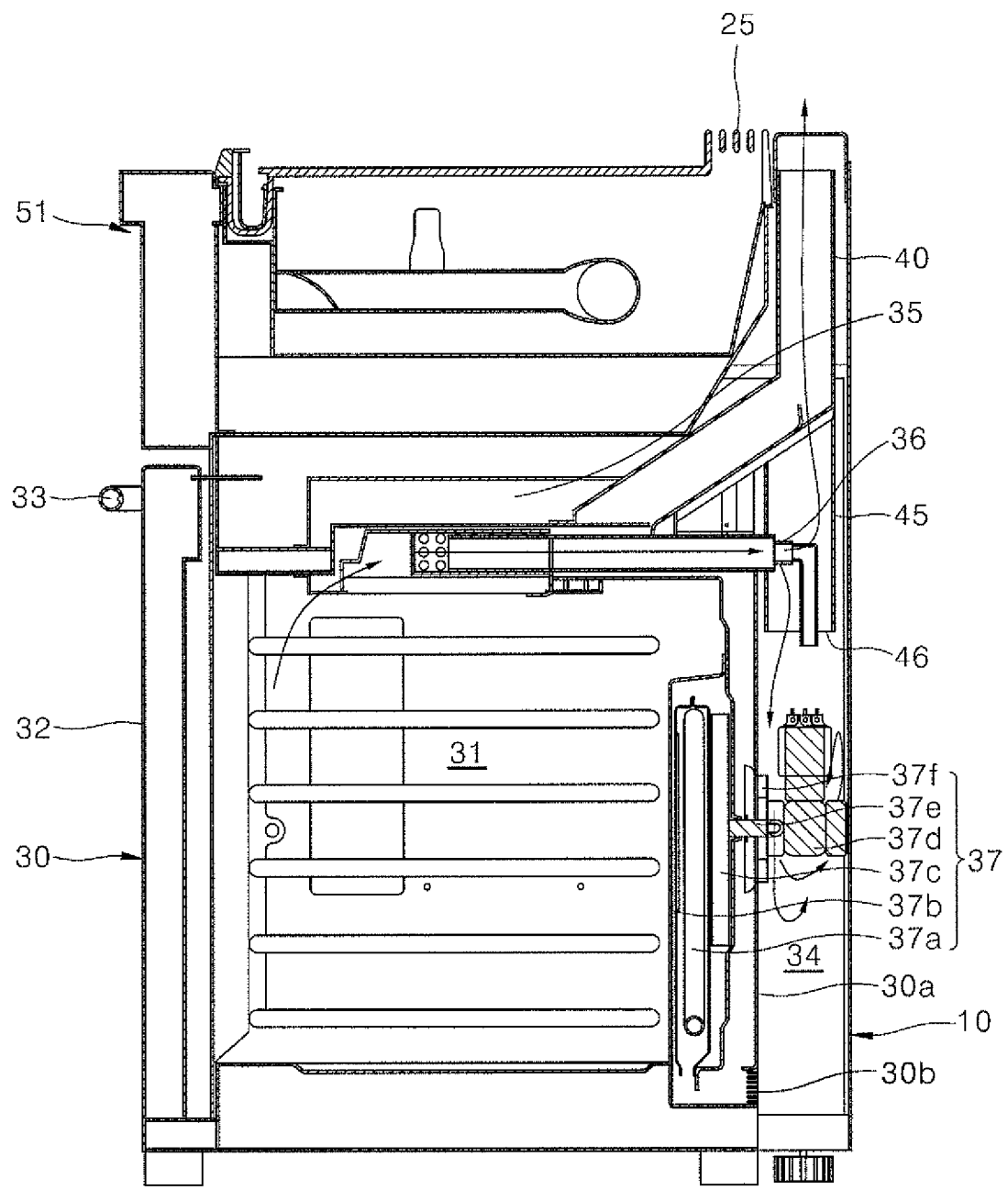
Figure 9:
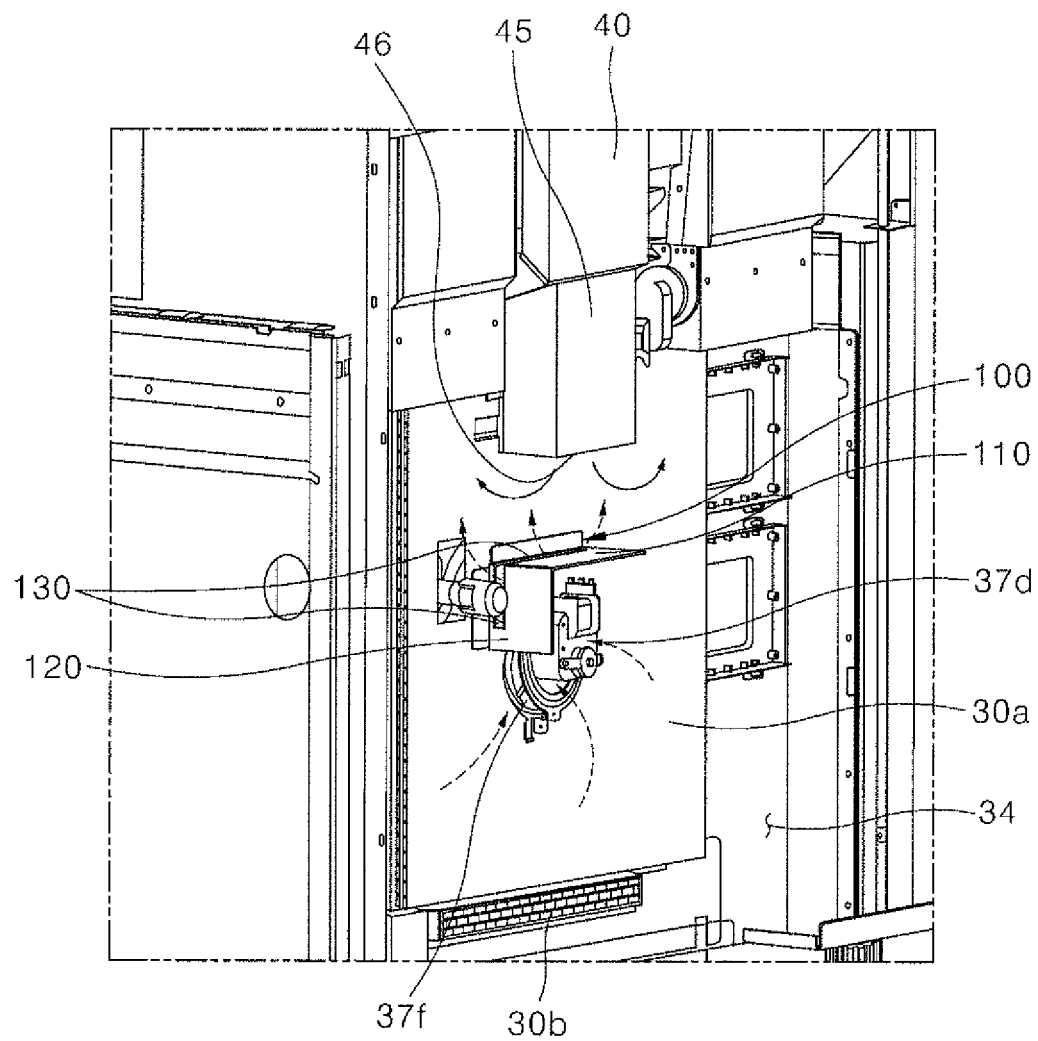
FIGS. 9 and 10 are views illustrating the flow of air currents that are generated in the cooking chamber and in the rear space of a cooking appliance according to an embodiment.
Figure 10:
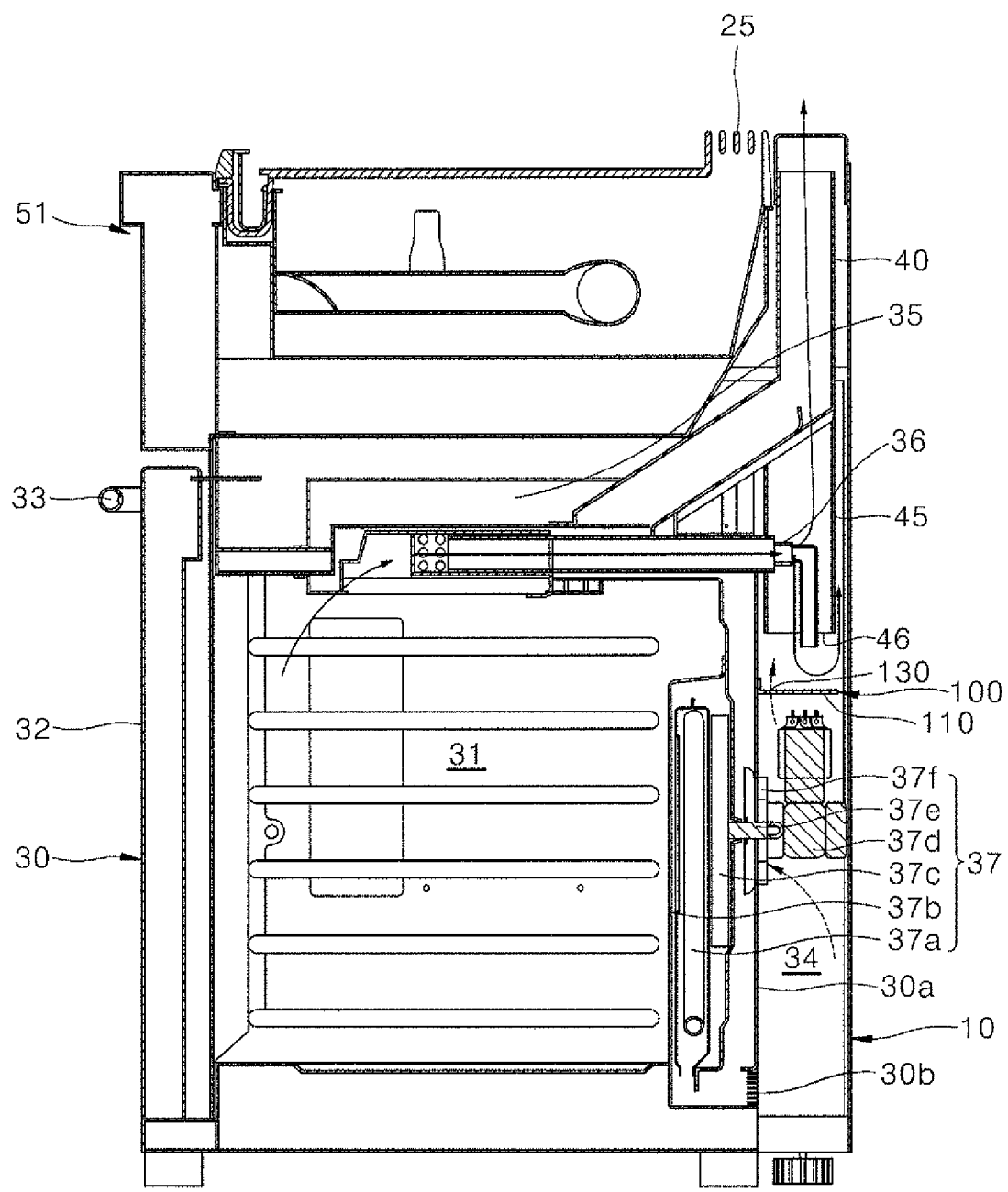

FIGS. 7 and 8 are views illustrating the countercurrent of heat that is generated in a cooking appliance without a blocking member, and FIGS. 9 and 10 are views illustrating the flow of air currents that are generated in the cooking chamber and in the rear space of a cooking appliance according to an embodiment.

Referring to FIGS. 7 and 8, the process of heating the inside of the cooking chamber 31 using the convection unit 37 is described as follows.

When the convection unit 37 operates and fuels in the burner 37a are combusted, flames generated by the combustion of the fuels in the burner 37a heats air of the accommodation space formed inside the fan cover 37b at high temperature.

When a convection fan 37c rotates while air is being heated in the accommodation space inside the fan cover 37b, the flow of air circulation in which air in the cooking chamber 31 is suctioned into the accommodation space inside the fan cover 37b through an intake opening of the fan cover 37b, and the heated air suctioned into the fan cover 37b is discharged to the cooking chamber through an exhaust opening of the fan cover 37b.

The convection fan 37c is rotated by the driving of the fan motor 37d. Additionally, the cooling fan 37f cools the fan motor 37d by rotating together with the convection fan 37c.

The cooling fan 37f attracts air around the fan motor 37d to the fan motor 37d inside the rear space 34, allows the air to cool the fan motor 37d, and discharges the air having used to cool the fan motor 37d laterally, i.e. radially.

When seen from above, the cooling fan 37f attracts air around the fan motor 37d to the fan motor 37d through the rear side of the fan motor 37d, and discharges the air having cooled the fan motor 37d out of the fan motor 37d through the front side of the fan motor 37d.

When the temperature of the cooking chamber 31 remains high for a long time as in the self-cleaning mode, high-temperature air inside the cooking chamber 31 may flow reversely to the rear space 34 through the opening 46.

The reversed flow occurs in the way that hot air inside the cooking chamber 31 is introduced into the broil burner 35 through the flame holes of the broil burner 35 and then passes the mixing tube 36 and the duct 45 and reversely flows to the rear space 34 through the opening 46.

Air currents generated by the fan motor 37d may play a leading role in occurrence of the reversed flow. In the structure in which the duct 45 and the convection fan 37c are disposed, the cooling fan 37f and the opening 46 has to be adjacent to each other. When the cooling fan 37f is rotated to cool the fan motor 37d in the state in which the cooling fan 37f and the opening 46 are close to each other, the suction force of the cooling fan 37f, which allows the surrounding air to flow to the fan motor 37d, is strongly applied around the opening 46.

By doing so, flow of the hot air inside the cooking chamber 31 is directed such that the hot air is discharged into the rear space 34 through the opening 46. Accordingly, the hot air inside the cooking chamber 31 may reversely flow to the rear space.

When the reversed flow occurs, hot air may be introduced into the fan motor 37d, may raise the temperature of the fan motor 37d, may raise the temperature of the rear space 34, and adversely affects various pipes and valves, other electronic parts and the like in the rear space 34. Additionally, as the temperature of the rear space goes up, the temperature of the outer wall of the cooking appliance also goes up, thereby adversely affecting the safety of a user.

To solve the above-described problems, the cooling appliance of the present disclosure, as illustrated in FIGS. 9 and 10, is provided with the blocking member 100 between the opening 46 of the duct 45 and the fan motor 37d.

The blocking member 100 blocks the path in which the suction force of the cooling fan 37f is applied to the opening 46 between the opening 46 and the cooling fan 37f. The blocking member 100 has a length long enough to protrude backward further than the fan motor 37d installed at the rear of the cooling fan 37f installed on the partition surface 30a considering that the suction force of the cooling fan 37f is applied through the rear sides of the cooling fan 37f and the fan motor 37d.

The blocking member 100 is disposed on the path in which the suction force of the cooling fan 37f is applied to the opening 46. The blocking member 100 blocks part of the airflow such that air around the opening 46 is not introduced into the fan motor 37d through the path. That is, the blocking member 100 blocks the path in which the suction force of the cooling fan 37f is applied to the opening 46 such that the suction force of the cooling fan 37f is not delivered to the opening 46, thereby effectively suppressing the countercurrent of hot air inside the cooking chamber 31 into the rear space through a second opening unit 46 of the duct 45.

In the area in which the blocking member 100 is not installed, the suction force of the cooling fan 37f is smoothly applied to the air around the fan motor 37d. Accordingly, the air around the fan motor 37d may flow to the fan motor 37d and may cool the fan motor 37d.

Additionally, the air discharging unit 130 that allows the air discharged from the cooling fan 37f to pass is formed in the blocking member 100. While the suction force of the cooling fan 37f is applied through the rear sides of the cooling fan 37f and the fan motor 37d, air is discharged from the cooling fan 37f through the front side of the cooling fan 37f. Considering this, the air discharging unit 130 is disposed in a position that is disproportionate to the front side adjacent to the cooling fan 37f and the partition surface 30a on the blocking member 100.

Accordingly, in the area in which the blocking member 100 is installed, the flow of air around the cooling fan 37f, which is suctioned into the cooling fan 37f, is blocked, and air blowing out of the front side of the cooling fan 37f only passes through the air discharging unit 130. Accordingly, the flow of air that is discharged to the opening 46 is only maintained.

With the air discharging unit 130 that is prepared and formed in the blocking member 100 as described above, the air having been used to cool the fan motor 37d may be smoothly discharged and accordingly, the air around the fan motor 37d may be smoothly circulated, thereby effectively cooling the fan motor 37d.

Additionally, the air passing through the air discharging unit 130 is discharged to the opening 46 of the duct 45. In this case, the opening 46 opens the lower end portion of the duct 45 downward, and the air passing through the air discharging unit 130 is discharged upward toward the opening 46.

The airflow blocks the flow of hot air that would be discharged through the opening 46, at the opening 46 and around the opening 46, or pushes up the flow of hot air that would be discharged through the opening 46 into the duct 45 again. The flow of hot air denotes a flow of hot air that would be discharged from the cooking chamber 31 to the rear space 34 through the opening 46.

That is, the blocking member 100 may form a blocking wall that blocks the path in which the suction force of the cooling fan 37f is applied to the opening 46, between the opening 46 and the cooling fan 37f, and at the same time, may provide a passage for discharging air currents that blocks the flow of hot air which would reversely flow through the opening 46.

The blocking member 100 allows air currents for blocking the flow of hot air reversely flowing through the opening 46 to be smoothly discharged while blocking the path in which the suction force of the cooling fan 37f is applied to the opening 46, thereby effectively suppress the countercurrent of the hot air into the rear space 34.

Additionally, the blocking member 100 is configured to block only the path in which the suction force of the cooling fan 37f is applied to the opening 46, but is not configured to block all the path around the cooling fan 37f and the fan motor 37d. By doing so, the cooling fan 37f may effectively cool the fan motor 37d, and the countercurrent of hot air into the rear space 34 may be effectively blocked.

The cooking appliance of the embodiment may improve combustion efficiency of the broil burner 35 with the operation of the convection fan 37c, the cooling fan 37f, and the blocking member 100.

Figure 11:
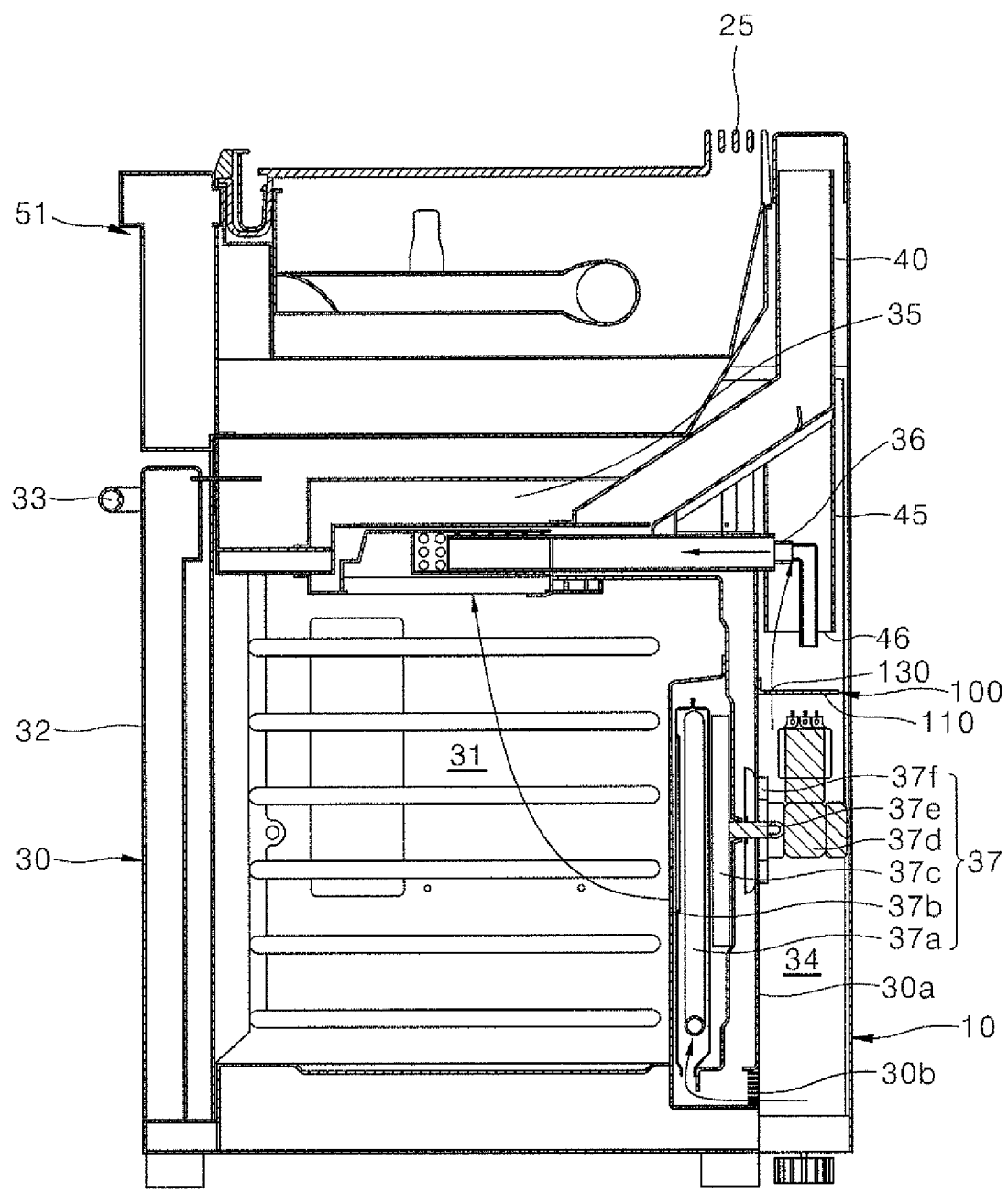
FIG. 11 is a view illustrating the flow of air supply into a broil burner that is provided to a cooking appliance according to an embodiment.

FIG. 11 is a view illustrating the flow of air supply into a broil burner that is provided to a cooking appliance according to an embodiment.

Referring to FIG. 11, the broil burner 35 is provided with primary air through the mixing tube 36 that communicates with the rear space 34. Additionally, when fuels of the broil burner 35 are combusted, air inside the cooking chamber 31 is provided as secondary air required for combusting fuels of the broil burner 35.

When the fan motor 37d operates, the convection fan 37c and the cooling fan 37f rotate together.

External air is introduced through the inlet 30b into the accommodation space inside the fan cover 37b in which the convection fan 37c is placed. The introduction of external air is facilitated by the rotation of the convection fan 37c, and air currents, in which the external air introduced is discharged to the cooking chamber 31, are generated. The air discharged to the cooking chamber 31 by the rotation of the convection fan 37c may be provided as secondary air required for combusting fuels of the broil burner 35.

Through the cooling fan 37f that rotates together with the convection fan 37c, air currents, in which air in the rear space 34 is introduced into the duct 45 through the air discharging unit 130 of the blocking member 100, are generated. In this case, the fan motor 37d is also cooled by the operation of the cooling fan 37f.

The air introduced into the duct 45 may be provided as primary air that is introduced into the broil burner 35 through the mixing tube 36.

In summary, primary air may be provided to the broil burner 35 using the cooling fan 37f and the blocking member 100, and secondary air may be provided to the broil burner 35 using the convection fan 37c that rotates together with the cooling fan 37f when the cooling fan 37f rotates.

That is, a sufficient amount of primary air and secondary air may be provided to the broil burner 35 with the operation of the blocking member 100 in which the air discharging unit 130 is formed, and the cooling fan 37f and the convection fan 37c that are driven together by the fan motor 37d, thereby enhancing combustion stability and thermal efficiency of the broil burner 35.

The above-described cooking appliance of the embodiment blocks the path in which the suction force of the cooling fan 37f is applied to the opening 46 and allows air currents for blocking the flow of hot air reversely flowing through the opening 46 to be smoothly discharged, thereby effectively suppressing the countercurrent of hot air into the rear space 34.

Additionally, the cooking appliance of the embodiment may effectively provide the operations of cooling the fan motor 37d by the cooling fan 37f and blocking the countercurrent of hot air into the rear space 34.

Further, the cooking appliance of the embodiment may allow of the supply of a sufficient amount of primary air and secondary air to the broil burner 35 with the operation of the blocking member 100 in which the air discharging unit 130 is formed, and the cooling fan 37f and the convection fan 37c that are driven together by the fan motor 37d, thereby enhancing combustion stability and thermal efficiency of the broil burner 35.

One objective of the present disclosure is to provide a cooking appliance that has an improved structure to suppress the countercurrent of hot air into a rear space of a cooking chamber.

Another objective of the present disclosure is to provide a cooking appliance that can effectively cool a fan motor and can effectively suppress the countercurrent of hot air.

The objectives are achieved by the features of the independent claim. As a means to achieve the above-described objectives, the cooking appliance according to an embodiment of the present disclosure includes a blocking member, which blocks the path of airflow from an opening of a duct outside a cooking chamber to a cooling fan disposed outside the cooking chamber.

The cooking appliance according to the same or another embodiment includes a blocking member that separates a duct, that connects the inside of a cooking chamber and the rear space of the cooking chamber, from a cooling fan, and the blocking member allows the flow of air from the cooling fan to an opening of the duct to pass and blocks the flow of air from the opening of the duct to the cooling fan.

The cooking appliance according an embodiment includes a convection fan that is installed in a cooking chamber; a fan motor that is installed outside the cooking chamber and that is configured to rotate the convection fan; a cooling fan that is installed outside the cooking chamber, and that is rotated by the fan motor to generate air currents which allow air around the fan motor flow to the fan motor; a duct that forms a passage which connects the inside of the cooking chamber and the outside of the cooking chamber, wherein an opening disposed outside the cooking chamber is opened toward the cooling fan; and a blocking member that is installed outside the cooking chamber and that blocks the path of airflow from the opening to the cooling fan.

The blocking member may comprise a first blocking unit that is placed between the opening and the cooling fan. The first blocking unit may form a blocking wall which is configured to separate the opening from the cooling fan; The blocking member may comprise a second blocking unit that extends from the first blocking unit. The second blocking unit may form a blocking wall extending in a direction of a tangent line of a circle formed by the cooling fan rotating.

The first and/or the second blocking unit may extend in a direction of a tangent line of a circle formed by the cooling fan rotating.

The second blocking unit may inclinedly extend from the first blocking unit.

An air discharging unit that is configured to allow air discharged from the cooling fan to pass may be formed in at least any one of the first blocking unit and the second blocking unit.

The air discharging unit may be formed in the shape of a slit that extends in a direction of a tangent line of a circle formed by the cooling fan rotating.

The air discharging unit formed in the first blocking unit may be formed to penetrate in a direction that faces the opening and allows air, discharged from the cooling fan, to pass in the direction that faces the opening.

The inside of the cooking chamber and the outside of the cooking chamber may be partitioned off by a partition surface in the front-rear direction. The convection fan, the cooling fan, and the fan motor are connected to the same axis and disposed in the front-rear direction. The cooling fan may be disposed between the convection fan that is placed at the forefront, and the fan motor that is placed at the rearmost position and is installed on the partition surface, the blocking member is installed on the partition surface.

The first blocking unit and/or the second blocking unit may have a width that extends in a direction of a tangent line of a circle formed by the cooling fan rotating. The first blocking unit and/or the second blocking unit may have a length that extends from the partition surface to the rear. The air discharging unit may be disproportionately placed toward the front side adjacent to the cooling fan on the first blocking unit or the second blocking unit.

The first blocking unit and the second blocking unit has a length long enough to protrude backward further than the fan motor. The air discharging unit may be placed further forward than the fan motor.

The cooking appliance may further comprise a broil burner that is placed inside the cooking chamber. The cooking appliance may further comprise a mixing tube that is connected with the broil burner and that is configured to supply mixed gases, in which air and gases are mixed, to the broil burner. The inside of the broil burner may communicate with the inside of the cooking chamber through flame holes formed in the broil burner. The inside of the cooking chamber and the outside of the cooking chamber may be partitioned off by a partition surface in the front-rear direction. A flow path that passes through the partition surface and connects the broil burner and the duct may be formed in the mixing tube.

The convection fan and the cooling fan may be connected to the same axis and may be rotated together by the fan motor. An inlet for supplying air outside the cooking chamber to the convection fan may be formed in the cooking chamber. When the convection fan and the cooling fan rotate, air currents, in which air introduced through the inlet flows to the broil burner by the rotation of the convection fan, may be generated, and air currents, in which air outside the cooking chamber flows to the mixing tube by the rotation of the cooling fan, may be generated.

According to a further embodiment, a cooking appliance comprises a cabinet including a cooking chamber and a rear space separated from each other by a partition surface, a convection fan installed inside the cooking chamber, a fan motor installed in the rear space and configured to rotate the convection fan, a cooling fan installed in the rear space for cooling the fan motor, the cooling fan configured to be rotated by the fan motor, an exhaust duct connecting an inside of the cooking chamber to an outside of the cabinet, a duct connecting the rear space and the exhaust duct, wherein an opening of the duct is disposed in the rear space and opened toward the cooling fan; and a blocking member for blocking a path of airflow from the opening to the cooling fan, the blocking member including a first blocking unit between the opening and the cooling fan. The fan motor, the cooling fan and the convection fan may have a common rotation axis. The partition surface may be disposed between the convection fan and the cooling fan.

The blocking member may further comprise a second blocking unit that extends at an angle from the first blocking unit in a plane perpendicular to a rotation axis of the cooling fan and/or to a rotation axis of the fan motor and/or in a plane parallel to the partition surface.

The first blocking unit and/or the second blocking unit may extend parallel to a tangent line of a rotary motion of the cooling fan. The first blocking unit and/or the second blocking unit may extend linearly in a plane perpendicular to a rotation axis of the cooling fan and/or to a rotation axis of the fan motor and/or in a plane parallel to the partition surface.

In a plane perpendicular to a rotation axis of the cooling fan and/or to a rotation axis of the fan motor and/or in a plane parallel to the partition surface, the first blocking unit may have a width being equal to or larger than a diameter of the cooling fan. In a plane perpendicular to a rotation axis of the cooling fan and/or to a rotation axis of the fan motor and/or in a plane parallel to the partition surface, the first blocking unit may extend perpendicular to a line connecting a center the opening and a center of the cooling fan.

The cooling fan may be configured to suction air along its rotation axis from a side facing the fan motor and to discharge the air either from a side facing away from the fan motor, i.e. facing the partition surface, or radially.

The first blocking unit and/or the second blocking unit may have a length in a direction parallel to the rotation axis of the cooling fan being equal to or larger than a minimum distance between the partition surface and the fan motor in said direction. That is, the first blocking unit and/or the second blocking unit may protrude at least as far from the partition surface as the cooling fan and/or the fan motor.

The first blocking unit and/or the second blocking unit may have a length to protrude from the partition surface further than the fan motor.

The cooling fan may be disposed between the partition surface and the fan motor, the cooling fan being configured to suction air at a side facing the fan motor and/or to discharge air radially.

An air discharging unit may be formed in the blocking member, i.e. in at least one of the first blocking unit or the second blocking unit, the air discharge unit being configured to allow air discharged from the cooling fan to pass through the blocking member toward the opening of the duct.

The air discharging unit may be placed closer to the partition surface than the fan motor. The air discharging unit may be formed as a slit in at least one of the first blocking unit and the second blocking unit at a position corresponding to the cooling fan for allowing to discharge air suctioned by the cooling fan towards the opening. That is, the slit may be formed in at least one of the first blocking unit and the second blocking unit at a position closer to the partition surface than the fan motor. The slit may have a length in a direction parallel to the rotation axis of the cooling fan being equal to or smaller than a maximum distance between the cooling fan and the partition surface in said direction. That is, the slit may extend less than a distance between the partition surface and the fan motor.

The fan motor and/or the blocking member may be installed on the partition surface.

The convection fan, the cooling fan, and the fan motor may be mounted on a shaft of the fan motor in said order, i.e. with the cooling fan disposed between the convection fan and the fan motor.

The cooking appliance may further comprise a broil burner inside the cooking chamber and a mixing tube connected to the broil burner for supplying a mixture of air and gases to the broil burner. The mixing tube may form a flow path that passes through the partition surface and connects the broil burner and the duct.

An inlet for supplying air from outside the cooking chamber to the convection fan may be formed in the cooking chamber, e.g. in or at the partition surface.

When the convection fan and the cooling fan rotate, air currents, in which air introduced through the inlet flows through the cooking chamber to the broil burner by the rotation of the convection fan, and air currents, in which air from the rear space flows to the mixing tube by the rotation of the cooling fan, may be generated.

With the configuration, the countercurrent of hot air into a rear space can be effectively suppressed by means of the blocking member blocking the path in which the suction force of the cooling fan is applied to the opening.

An air discharging unit that allows air discharged from the cooling fan to pass may be formed in at least any one of a first blocking unit and a second blocking unit. Preferably, the air discharging unit formed in the first blocking unit may be formed to penetrate in a direction that faces the opening, and may allow the air discharged from the cooling fan to pass in the direction that faces the opening.

With the configuration, air currents for blocking the flow of hot air reversely flowing through the opening may be smoothly discharged, thereby effectively suppressing the countercurrent of hot air into the rear space.

Additionally, the convection fan and the cooling fan may be connected to the same axis and may be rotated together by the fan motor. Also an inlet for supplying air outside the cooking chamber to the convection fan may be formed in the cooking chamber. When the convection fan and the cooling fan rotate, air currents, in which air introduced through the inlet flows to the broil burner by the rotation of the convection fan, may be generated, and air currents, in which air in the rear space flows to a mixing tube by the rotation of the cooling fan, may be generated.

With the configuration, a sufficient amount of primary air and secondary air may be provided to a broil burner, thereby enhancing combustion stability and thermal efficiency of the broil burner.

The cooking appliance of the present disclosure may effectively suppress the countercurrent of hot air into a rear space by blocking the path in which the suction force of the cooling fan is applied to the opening and by allowing air currents for blocking the flow of hot air reversely flowing through the opening to be smoothly discharged.

Additionally, the cooking appliance may allow the cooling fan to effectively cool the fan motor, and may effectively block the countercurrent of hot air into the rear space.

Further, in one embodiment, the cooking appliance may supply a sufficient amount of primary air and secondary air to the broil burner with the operation of the blocking member in which an air discharging unit is formed and with the operation of the cooling fan and the convection fan that are driven together by the fan motor, thereby enhancing combustion stability and thermal efficiency of the broil burner.

The present disclosure has been described with reference to the embodiments illustrated in the drawings. However, the embodiments are provided only as examples. It will be apparent to one having ordinary skill in the art that the embodiments are intended to cover various modifications and equivalents of the disclosure. Thus, the technical scope of the present disclosure should be defined by the appended claims.

DESCRIPTION OF THE SYMBOLS

10: Chamber
20: Cooktop unit
21: Cooktop case
25: Exhaust vent
30: Oven unit
30a: Partition surface
30b: Inlet
31: Cooking chamber
32: Door
34: Rear space
35: Broil burner
36: Mixing tube
37: Convection unit
37a: Burner
37b: Fan cover
37c: Convection fan
37d: Fan motor
37e: Shaft
37f: Cooling fan
40: Exhaust duct
45: Duct
46: Opening
51: Control panel
52: Input unit
53: Display unit
100: Blocking member
110: First blocking unit
120: Second blocking unit
130: Air discharging unit

What is claimed is:

1. A cooking appliance, comprising:
a convection fan installed in a cooking chamber;
a fan motor installed outside of the cooking chamber and configured to rotate the convection fan;
a cooling fan installed outside of the cooking chamber, and rotated by the fan motor to generate air currents which flow to the fan motor;
a duct that forms a passage that connects an inside of the cooking chamber and the outside of the cooking chamber, wherein an opening in the duct is opened toward the cooling fan; and
a blocking member installed outside of the cooking chamber, and configured to block a path of air flow from the opening to the cooling fan, wherein the blocking member comprises:
a first blocking member positioned between the opening and the cooling fan and forming a blocking wall configured to separate the opening from the cooling fan;
a second blocking member that extends from the first blocking member; and
an air discharge unit configured to allow air, discharged from the cooling fan, to pass therethrough formed in at least one of the first blocking member or the second blocking member, wherein the first blocking member and the second blocking member each has a width that extends in a direction of a tangent line of a circle formed by rotation of the cooling fan, and a length that extends rearwardly from a partition surface by which the inside of the cooking chamber and the outside of the cooking chamber are partitioned in a frontward-rearward direction, and wherein the air discharge unit is disproportionately located toward a front side adjacent to the cooling fan on the first blocking member or the second blocking member.

2. The cooking appliance of claim 1, wherein the second blocking member extends at an incline from the first blocking member.

3. The cooking appliance of claim 1, wherein the air discharge unit is formed in a shape of a slit that extends the direction of the tangent line of the circle formed by rotation of the cooling fan.

4. The cooking appliance of claim 1, wherein the air discharge unit is formed in the first blocking member and penetrates in a direction toward the opening, and allows air, discharged from the cooling fan, to pass in the direction toward the opening.

5. The cooking appliance of claim 1, wherein the convection fan, the cooling fan, and the fan motor are connected to a same axis and disposed in the frontward-rearward direction, wherein the cooling fan is disposed between the convection fan which is in a frontmost position, and the fan motor which is in a rearmost position, and is installed on the partition surface, and wherein the blocking member is installed on the partition surface.

6. The cooking appliance of claim 1, wherein the first blocking member and the second blocking member each has a length sufficient to protrude backward further than the fan motor, and wherein the air discharge unit is located further forward than the fan motor.

7. The cooking appliance of claim 1, wherein the cooking appliance further comprises:
a broiler burner disposed inside of the cooking chamber, and a mixing tube connected with the broiler burner and configured to supply a mixed gas, in which air and gas are mixed, to the broiler burner, wherein an inside of the broiler burner communicates with the inside of the cooking chamber through flame holes formed in the broiler burner, and wherein a flow path that passes through the partition surface and that connects the broiler burner and the duct is formed in the mixing tube.

8. The cooking appliance of claim 7, wherein the convection fan and the cooling fan are connected to a same axis and are rotated together by the fan motor, wherein an inlet that supplies air outside of the cooking chamber to the convection fan is formed in the cooking chamber, and wherein when the convection fan and the cooling fan rotate, air currents, in which air introduced through the inlet flows to the broiler burner by rotation of the convection fan, are generated, and air currents, in which air outside of the cooking chamber flows to the mixing tube by the rotation of the cooling fan, are generated.

9. A cooking appliance, comprising:
a convection fan installed in a cooking chamber;
a fan motor installed outside of the cooking chamber and configured to rotate the convection fan;
a cooling fan installed outside of the cooking chamber, and rotated by the fan motor to generate air currents which flow to the fan motor;
a duct that forms a passage that connects an inside of the cooking chamber and the outside of the cooking chamber, wherein an opening in the duct is opened toward the cooling fan; and
a blocking wall installed outside of the cooking chamber, and configured to block a path of air flow from the opening to the cooling fan, wherein the blocking wall comprises:
a first blocking wall positioned between the opening and the cooling fan;
a second blocking wall that extends downward from the first blocking wall at an incline; and
a slit configured to allow air, discharged from the cooling fan, to pass therethrough is formed in at least one of the first blocking wall or the second blocking wall, wherein the first blocking wall and the second blocking wall each has a width that extends in a direction of a tangent line of a circle formed by rotation of the cooling fan, and a length that extends rearwardly from a partition surface by which the inside of the cooking chamber and the outside of the cooking chamber are partitioned in a frontward-rearward direction, and wherein the air discharge unit is disproportionately located toward a front side adjacent to the cooling fan on the first blocking wall or the second blocking wall.

10. The cooking appliance of claim 9, wherein the slit extends in the direction of the tangent line of the circle formed by rotation of the cooling fan.

11. The cooking appliance of claim 9, wherein the slit is formed in the first blocking wall and penetrates in a direction toward the opening, and allows air, discharged from the cooling fan, to pass to the opening.

12. The cooking appliance of claim 9, wherein the convection fan, the cooling fan, and the fan motor are connected to a same axis and disposed in the frontward-rearward direction, wherein the cooling fan is disposed between the convection fan which is in a frontmost position, and the fan motor which is in a rearmost position, and is installed on the partition surface, and wherein the blocking wall is installed on the partition surface.

13. A cooking appliance, comprising:
a convection fan installed in a cooking chamber;
a fan motor installed outside of the cooking chamber and configured to rotate the convection fan;
a cooling fan installed outside of the cooking chamber, and rotated by the fan motor to generate air currents which flow to the fan motor;
a duct that forms a passage that connects an inside of the cooking chamber and the outside of the cooking chamber, wherein an opening in the duct is opened toward the cooling fan; and
a blocking wall installed outside of the cooking chamber, and configured to block a path of air flow from the opening to the cooling fan, wherein the blocking wall comprises:
a first blocking wall positioned between the opening and the cooling fan; and
a second blocking wall that extends from the first blocking wall in a direction of a tangent line of a circle formed by rotation of the cooling fan; and
a slit configured to allow air, discharged from the cooling fan, to pass therethrough is formed in at least one of the first blocking wall or the second blocking wall, wherein the first blocking wall and the second blocking wall each has a width that extends in a direction of a tangent line of a circle formed by rotation of the cooling fan, and a length that extends rearwardly from a partition surface by which the inside of the cooking chamber and the outside of the cooking chamber are partitioned in a frontward-rearward direction, and wherein the air discharge unit is disproportionately located toward a front side adjacent to the cooling fan on the first blocking wall or the second blocking wall.

* * * * *